(12) United States Patent
Adler et al.

(10) Patent No.: US 7,870,432 B2
(45) Date of Patent: Jan. 11, 2011

(54) METHOD AND DEVICE FOR DYNAMICALLY GENERATING TEST SCENARIOS FOR COMPLEX COMPUTER-CONTROLLED SYSTEMS, E.G. FOR MEDICAL ENGINEERING INSTALLATIONS

(75) Inventors: Harry Adler, Eckental (DE); Adrian von Grafenstein, Frensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 893 days.

(21) Appl. No.: 11/492,426

(22) Filed: Jul. 25, 2006

(65) Prior Publication Data
US 2007/0038039 A1 Feb. 15, 2007

(30) Foreign Application Priority Data
Jul. 29, 2005 (DE) .................. 10 2005 036 321

(51) Int. Cl.
*G06F 11/00* (2006.01)
(52) U.S. Cl. ............... 714/38; 714/46; 714/57; 717/174
(58) Field of Classification Search ............. 714/38, 714/46, 57
See application file for complete search history.

(56) References Cited

U.S. PATENT DOCUMENTS

| | | | | |
|---|---|---|---|---|
| 5,754,760 A * | 5/1998 | Warfield | ............ | 714/38 |
| 5,911,041 A * | 6/1999 | Schaffer | ............ | 714/38 |
| 6,078,947 A * | 6/2000 | Kagermeier | ............ | 709/203 |
| 6,279,124 B1 * | 8/2001 | Brouwer et al. | ............ | 714/38 |
| 6,351,826 B1 * | 2/2002 | Kato | ............ | 714/38 |
| 6,438,565 B1 * | 8/2002 | Ammirato et al. | ............ | 715/204 |
| 6,473,096 B1 * | 10/2002 | Kobayashi et al. | ............ | 715/731 |
| 6,993,470 B2 * | 1/2006 | Baumgartner et al. | ............ | 703/17 |
| 7,403,886 B2 * | 7/2008 | Odhner et al. | ............ | 703/21 |
| 7,496,820 B1 * | 2/2009 | Theron et al. | ............ | 714/738 |
| 2002/0116694 A1 | 8/2002 | Fournier et al. | | |
| 2003/0009429 A1 * | 1/2003 | Jameson | ............ | 706/45 |
| 2003/0056173 A1 | 3/2003 | Copenhaver et al. | | |
| 2003/0163770 A1 * | 8/2003 | Webster et al. | ............ | 714/47 |
| 2004/0003325 A1 * | 1/2004 | Muller et al. | ............ | 714/38 |
| 2004/0078742 A1 * | 4/2004 | Emek et al. | ............ | 714/728 |
| 2004/0153831 A1 * | 8/2004 | Kuth | ............ | 714/38 |
| 2004/0249575 A1 * | 12/2004 | Hellmold | ............ | 702/19 |
| 2005/0033977 A1 * | 2/2005 | Zurita et al. | ............ | 713/200 |
| 2005/0063511 A1 * | 3/2005 | Hahm et al. | ............ | 378/91 |
| 2005/0081109 A1 * | 4/2005 | Czerwonka | ............ | 714/38 |
| 2005/0203720 A1 * | 9/2005 | Lagoon et al. | ............ | 703/2 |
| 2006/0107141 A1 * | 5/2006 | Hekmatpour | ............ | 714/724 |
| 2006/0190871 A1 * | 8/2006 | Likovich et al. | ............ | 716/5 |

(Continued)

FOREIGN PATENT DOCUMENTS

EP 0 453 394 B1 10/1991

(Continued)

*Primary Examiner*—Scott T Baderman
*Assistant Examiner*—Chae Ko (57) ABSTRACT

The invention relates to a method and a device for testing complex computer-aided installations, in particular medical engineering installations, which can be operated by different persons in different ways. A plurality of operating scenarios are recorded via a recording unit. The operating scenarios are analyzed into a sequence of operating steps and assigned to classes. By accessing a rule base in which dependencies between the individual operating steps are filed, at least one test scenario is generated dynamically and automatically which can be executed automatically in a subsequent step.

19 Claims, 6 Drawing Sheets

U.S. PATENT DOCUMENTS

2006/0277209 A1 * 12/2006 Kral et al. .................. 707/102
2007/0214391 A1 * 9/2007 Castro et al. ................. 714/38
2008/0294985 A1 * 11/2008 Milov ......................... 715/704

FOREIGN PATENT DOCUMENTS

JP 2003099285 A * 4/2003
WO WO 2006132564 A1 * 12/2006

* cited by examiner

METHOD AND DEVICE FOR DYNAMICALLY GENERATING TEST SCENARIOS FOR COMPLEX COMPUTER-CONTROLLED SYSTEMS, E.G. FOR MEDICAL ENGINEERING INSTALLATIONS

CROSS REFERENCE TO RELATED APPLICATIONS

This application claims priority of German application No. 10 2005 036 321.0 filed Jul. 29, 2005, which is incorporated by reference herein in its entirety.

FIELD OF THE INVENTION

The present invention lies in the field of the testing of complex computer-controlled systems, in particular medical engineering installations and devices or installations in the field of production engineering or other technical fields and relates in particular to a method and a device for generating test scenarios under which such an installation and/or such a device, preferably from the clinical environment, is to be checked for freedom from faults.

BACKGROUND OF THE INVENTION

There are basically two test strategies: blackbox testing, as it is called, and whitebox testing. The present invention relates to blackbox testing in which the respective installation is tested from the customer viewpoint by means of simulated operation by the customer. The structure of the installation, in particular software-related and/or hardware-related programming details, are not known. The object to be tested functions like a black box, in contrast to whitebox testing, where the structure and the software code are known to the test engineer.

Medical engineering installations which are deployed in particular in the clinical environment are normally operated by different persons and/or deployed or applied in different ways. If such an installation is to be tested, then it is necessary to take into account and to cover in the test the different types of operation and the different usage behavior of different persons and/or clinics.

In the prior art, it is known in this context for requirement-based tests to be executed. These tests are, however, restricted only to a small section of the testing. They are designed in order to check whether the installation to be tested fulfills the respective requirements defined in advance by means of requirement and design specifications and by means of functional specifications. If, for example, a computer tomograph is to be tested, then a requirement-based test can cover only whether the computer tomograph also produces the desired and necessary sectional images. However, this represents only a small section of test scenarios. For example, it should also be possible to investigate whether the installation also terminates fault-free where a user has triggered an incorrect or defective sequence of instructions or operating steps. An aggravating factor in this context is that a desired result of the medical installation to be tested (for example, of a computer-tomography installation) can be achieved in a different way, i.e. through different sequences of operating steps. It should also be possible for these different operating options to be covered by a test.

Tests to date have been implemented statically, i.e. only predefined types of operation can be tested. In practice, however, such a method has proved disadvantageous. Firstly, only a relatively low test coverage can be achieved using this method and secondly, it is not possible with this method to adapt the test dynamically to the application situation in each case.

In currently known systems there is no interaction and no exchange of information between the manufacturer of the equipment on the one hand and the user or operator of the equipment on the other. This results in checking and test routines, in the case of medical installations with medical knowledge, basically being set up manually. A systematic method that also includes previously gathered test-relevant data in the generation of future data has therefore not been possible until now.

SUMMARY OF THE INVENTION

The object of the present invention is therefore to indicate a way in which it is possible to improve the testing of installations of the type specified in the introduction, in particular medical engineering installations, and in particular to arrange it more flexibly so that it can be tailored to different groups of persons and/or different application scenarios, and by means of which in addition test coverage can be extended.

This object is achieved in a method for testing installations or devices, in particular medical engineering installations or devices, which can be operated by different persons in a different application environment and in different ways, comprising the following process steps:
recording of a plurality of operating scenarios,
analysis of each recorded operating scenario into a sequence of operating steps,
categorizing or assigning of the individual operating steps into/to classes,
recording of dependencies between the individual operating steps and/or between the classes of operating steps,
dynamic generating of at least one test scenario, based on a selection of recorded operating steps and/or based on the assignment of the recorded operating steps to classes and/or based on rules.

In the explanatory comments below, a medical engineering installation for which the test scenarios are generated is frequently taken to be a specific preferred exemplary embodiment—without restricting the invention hereto.

Normally, the test scenario generated dynamically according to the invention is executed, preferably automatically, immediately or shortly after being generated. Execution is not, however, a necessary component of the method. It is also possible to arrange only for a test scenario to be generated which, for example, cannot be executed initially at all or can be executed at a later time. In the preferred embodiment, the method according to the invention therefore comprises the following process step: automatic execution of the dynamically generated test scenario by a player module.

The player module can be defined as an execution unit, so to speak, for the dynamically generated test scenarios.

A substantial advantage of the solution according to the invention is that the test routines generated can now be set up systematically, whereby collected usage data that is preferably covered by the recorded operating scenario, is analyzed and forwarded to the player module for execution. In this way, both improved support for the installation concerned and an improved test sequence can be made available. This is possible where the most frequently applied investigative sequences (in the sequence of operating steps), the variances in the investigative sequences and usage changes are recorded on the installation by the customer and can be processed when generating the test scenario. Furthermore, improved fault diagnosis is possible.

A master computer, a host as it is called, is provided both for the user of the installation and for the manufacturer of the installation which are exchanging data (remote transfer) with one another. The user's host interacts with a recorder device and the manufacturer's host interacts with the player module. The recorder device is intended to record usage conditions (of the respective user) of the installation and to forward these to the manufacturer's host. An employee of the manufacturer can then analyze transmitted usage conditions in order by means of this knowledge to select test routines, optionally by accessing a database. Alternatively, it is also possible to carry out the procedure outlined above fully automatically, the test routines being generated automatically on the basis of the recorded usage conditions. The collected and/or processed data can be filed in a database.

Over and above this, a feedback link to test scenarios that have already been generated is also possible. In a control unit, probabilities are accessed for executing the individual operating steps. In particular, a mechanism is provided that makes it possible for individual parts of the test scenario to be generated not to have to be generated more than once, as they have already been generated in the past. These steps and/or parts are then extracted. In this way, the number of variants can advantageously be reduced. Based upon a feedback link to test results already achieved, it is also possible to adapt the respective probabilities dynamically for the operating steps.

In a fault-free application of a medical engineering installation, a specific workflow, i.e. a sequence of operating steps, can as a rule be stipulated. As a rule, most medical engineering installations operate in a computer-based manner. As a first operating step, a user must e.g. "power up" the computer system. In a second or subsequent operating step, he must dial in and/or log in as an authorized user. Only subsequently is it possible to execute specific work steps. For each deployment involving the medical engineering installation it is possible to define one or usually multiple different workflows. A workflow consists of a sequence of specific operating steps. At the same time, it is possible for a desired result of the medical engineering installation to be achieved through the execution of different workflows. According to the invention, a recorded workflow for an installation already being deployed can then be used for testing another installation of the same type. To do this, the recorded workflow is either used directly (that is, without modifications) or it is adapted for the installation to be tested.

It is also possible to generate at least one workflow from multiple installations of the same type being deployed simultaneously by amalgamating the parallel applications of the installations—possibly at different operating locations. The solution according to the invention can thus also be deployed in distributed systems.

It is also possible to use a generated test scenario for multiple installations to be tested in parallel.

According to the invention, all operating steps which are executable in principle are assigned to or categorized in classes according to configurable criterion classes. In the preferred embodiment, the criteria are preconfigured in relation to the timing of execution of the respective operating steps. With reference to the above example, a log-in class could thus be defined here, comprising the operating steps of start-up, log-in, authorization etc. Besides a plurality of further classes of operation (e.g. simple "Generate-a-laminogram", "Execute-reconstruction-method", "Load-a-previously-recorded-image", etc.) a log-off class can also be defined, comprising the logging off of the respective user from the system.

Based upon the necessary temporal sequence of certain operating steps or of certain classes, it is possible to derive and to define rules in which the technical preconditions for executing certain operating steps are filed. Thus, for example, a magnetic-resonance-tomography installation can be operated by the user only if the user has previously logged into the system and obtained authorization. If these rules are not observed, then a case of incorrect operation applies and the installation has to respond in a suitable manner (in particular by means of an error message). According to the invention, it is thus possible to test errors in the operation of the system or worst-case operation as well as fault-free application of the system or best-case operation. In the latter case, a fault is produced, so to speak, by the test, and the installation can be tested for correctly responding in relation to this fault provocation (e.g. by means of an appropriate error message).

In addition, it is provided in a preferred development of the invention that further processes can be triggered by the carrying out of operator errors. Thus it is, for example, possible to derive a requirement of further training for customers from the operator errors so as to be able to improve processes overall. In this embodiment, modules according to the invention interact with a tracing module in which the previously recorded operator errors are recorded and with a trigger module which, based on the operator errors recorded in the tracing module, initiates one or more possible further processes, in particular training-related processes.

Once a plurality of operating steps is recorded, it is possible according to the invention to generate dynamically at least one test scenario. In so doing, the operating steps can be combined with one another in a random manner or according to a configurable mechanism.

It is, however, also possible to gear the test more specifically by combining the recorded operating steps not in a random manner but according to the rules for fault-free operation of the installation (e.g. first 'switch on', then 'load image'). In this embodiment, rules are accessed which comprise dependencies between the individual operating steps and/or between their classes. A test scenario is generated, by combining the recorded operating steps such that the rules are complied with.

In the preferred embodiment, the rules are related to the individual operating steps (e.g. first 'operating step 1', then→'operating step 2'→'operating step 3',→ . . . ). In an alternative embodiment of the invention the rules are not related to the individual operating steps, but to the classes thereof (e.g. first 'log-in class', then→'class for image-generating'→'log-off class'). It is normally provided that the definition of the rules is configurable. If the rules are generated only at class level, then less system knowledge is required. The more detailed the knowledge about the installation to be tested is, the more finely the rules can be structured and defined, even to the level of individual operating steps.

Advantageously, the solution according to the invention can be subdivided into three phases:

A recording phase: the individual operating scenarios are recorded in this recording phase. This is normally carried out by means of a tracing of normal installation operations. Thus, when a user is operating the installation, then the instructions issued by him are carried out and stored in a log file. It is also possible alternatively and/or cumulatively to import other operating scenarios via an interface. If, for example, an installation with the same functionality is already in deployment and if different operating scenarios have already been recorded for this installation, then these can be used for the testing of a further developed installation (with the same functionality). Normally, the recorded operating scenarios are also analyzed into individual operating steps in this recording phase and optionally categorized in classes. Normally, the accessing of rules is also carried out in this phase. If the usages or usage customs of the installation are not permanently recorded, they can also be recorded sporadically or just one-off and then rerecorded after predefinable events. In this way, changes can automatically be detected with regard to usage conditions.

A test-generation phase: in this phase, at least one test scenario is dynamically generated. Based on the operating scenarios recorded and analyzed into individual steps, at least one test scenario is generated.

A test-implementation phase: In this phase, the generated test scenario is executed automatically in a medical engineering installation.

By virtue of the temporal subdivision of the solution according to the invention into phases, it is possible to save system resources for execution of the respective installation test. A further advantage is that the method according to the invention is modularly divided into individual method packages, and constantly recurring work steps consequently do not have to be repeatedly executed in the course of a test but can also be used for executing other or later tests. System knowledge can thus be centralized.

A further advantage of the division into phases lies in the temporal variability. On the one hand, it is possible to execute all the process steps in the test-generating phase. On the other, it is possible for some process steps to be executed in an upstream process step. This upstream process step can comprise the following:
recording of operating scenarios,
generating of operating steps,
categorizing of operating steps into classes,
defining of rules,
collecting and analyzing of usage of an installation, in particular by analyzing a "usage log"
recording of changes regarding usage of the installation,
targeted tracking of operator errors on an installation,
targeted simulation of faults,
accessing of rules.

A recorder device, for example in the form of a recorder module, is particularly preferably arranged in at least one medical engineering installation of the installation type to be tested or of a similar installation type that is already in active clinical service. With this recorder device a plurality of real operating scenarios can then be recorded and logged. Using these logged operating scenarios, at least one test scenario is then generated. This has firstly the advantage that the operating scenarios are particularly realistic and, for example, that possible operator errors which the testing engineers may not have thought of at all (e.g. including precise temporal sequences) are recorded and taken into account. Furthermore, the additional time for generating the operating scenarios needed as a basis for the test scenarios is saved.

A particular advantage of the solution according to the invention is that the automatic and dynamic generating of a test scenario can be configured in accordance with specific criteria. It is configurable which combination of operating steps is used for generating the test scenario. In particular, it can be configured whether all possible combinations of a best-case operation are to be used and/or all or selected operating steps which cause a worst-case operation. A mix of best-case and worst-case operation is also possible.

In the preferred embodiment, the dependencies which are defined between the individual operating steps and/or between their classes, are logical and/or temporal dependencies. It is also possible to take into account other functional dependencies. This adjustment mechanism with regard to the dependencies makes it possible to adjust the inventive generation of a test scenario adaptively to the application scenario concerned and to arrange it very flexibly. The basic rule which applies is that the more dependencies or the more rules which are defined, the more specifically the test is geared, the faster it runs and the lower is the coverage of the test. Conversely, it is also possible to select as broad a test coverage as possible by defining as few rules as possible.

A key point of the method according to the invention is that the generating of the test scenario or the version of the test scenario generated can be defined automatically by the user and/or according to eligible criteria. In this case, a version of the generated test scenario is preferably configurable by recording at least one parameter in an additional process step. This is possible if e.g. a test engineer configures certain parameters. This is normally carried out via a specific user interface. This feature makes it possible to match the method to the respective customer-relevant usage of the installation. If, for example, the installation is used only in a certain environment, then it makes no sense to test the installation for other usages. The test can then be restricted to suit the specific usage. This is, for example, the case where special clinical procedures are provided. It is also possible to design the test scenario e.g. for a "very high patient throughput" or for a "film-free hospital". If, for example, it is provided in a certain clinical procedure that the images generated by a computer tomograph are as a matter of principle to be forwarded only via electronic media to other instances and are not to be printed out, then it makes no sense to test printout instructions at this point. The test can according to the invention advantageously be restricted to the relevant test scenarios only. In this way, real customer operation of the installation can be mapped as optimally as possible without giving rise to an unnecessarily large and thus no longer manageable (or manageable only at a very high administrative cost) number of test scenarios. For generating the test scenario according to the invention, it is also possible to take into account previously generated test steps and paths, so the possible number of test variants is reduced while the number of scenarios rises. It is optimal in this respect if all possible partial operating sequences have to be carried out once and once only.

In the advantageous development of the invention, at least one of the process steps mentioned above is executed automatically. In particular, the dynamic generating of the test scenario is executed automatically. The recording of the operating scenarios is preferably also carried out automatically, whereby an operation of the installation in real deployment is carried out or logged. It is possible to execute this locally. Alternatively it is possible to allow certain operating steps to be selected via a specific user interface. Normally, the personnel that later operate the installation should also stipulate the sequence of user steps here. The other steps of the method can be initiated through appropriate user inputs. In addition to this, it is possible to allow all the steps of the method to be executed automatically.

According to the invention, rules are accessed which comprise dependencies between the individual operating steps and/or dependencies between their classes. There are options here with regard to how access to the rules can be effected:

It is possible for the rules to be generated automatically, for example, by accessing a knowledge-based system. The knowledge-based system is designed in normal use of the installation to filter out a certain sequence of operating steps, to extract these and in this way to generate defined workflows. The workflows can be labeled with priorities, so procedures can be subdivided depending on how probable their real execution in the field is. The definition of rules is carried out automatically in this embodiment and is triggered by normal use of the installation.

A simpler and more cost-effective embodiment provides that the rules are imported by means of user inputs from an external source or via a specifically designed user interface. This feature makes it possible for the generated test scenario to be oriented device-specifically, for example, for only certain options for operating the device to be selectable while the recorded operating scenarios are application-specific, and can in particular be matched to the actual use of installations in the field.

A further option for flexible adaptation of the method according to the invention is that the rules can also be recorded and/or changed for executing the test. In this way, the test engineer can exert influence on the further implementation of the test. He thus has the facility to change the number of rules and thus to modify the coverage of the test. Furthermore, he can alter the content of the rules such that, for example, the individual operating steps are no longer combined according to the principle of chance but according to predefinable rules that are based on probability data. From the class of basically possible operating steps, the operating step is then selected which in normal operation of the installation would most probably be selected.

In order for the test engineer to be able to gain an overview of the inventive method and the generated test scenario, it is provided that the classes formed, the rules and/or the generated test scenario and optionally the configured parameters be displayed. In this way, changes in the variables specified above and in their impact can readily be traced.

In the preferred embodiment, the test scenario generated according to the invention is not restricted to a certain type of testing. Cumulatively, or as an alternative to testing a best-case operation of the installation (i.e. fault-free operation) worst-case operation of the installation (and thus a fault provocation) can also be tested. The generated test scenario thus comprises at least one best-case operation and/or one worst-case operation of the installation. In this way, the options for deployment of the method according to the invention can advantageously be increased. In an alternative simpler embodiment of invention the test scenario can be restricted to just one of the two types of operation mentioned above.

As a rule, the test scenario is generated by investigating at every point in time within the workflow or within the operating flow of the installation which operating steps can basically be executed at this time. This investigation is generally carried out after each operating step. From the set of basically executable operating steps at least one operating step is then selected and this is then added as a further step to the test scenario to be generated. With regard to the selection of possibilities of one operating step from the set of operating steps that are basically possible, several alternatives are provided according to the invention:

A chance mechanism: the operating step is selected according the principle of chance from the set of possible and executable operating steps. This has the advantage that no additional knowledge is required and that it can be configured that all operating paths (forming part of a fictitious operating tree that is meant to symbolize the operating options of the installation) are run through at least once and/or equally frequently. Using the chance mechanism, the coverage of the test can be broadened.

A probability-based mechanism: in the case of this mechanism, an operating step is selected in the test scenario from the set of basically possible operating steps in accordance with the probability of its also being selected in the field by the user. Here, the most probably executed operating steps (and thus probably also the most important operating steps) can be executed initially. The operating steps with a lower probability of being selected at this point in time by the operating personnel, can be tested later. It is therefore possible here to define certain probabilities for the sequence of operating steps. It can be defined here e.g. that a technical installation is normally operated by the sequence of operating steps A, B, C, to F with a probability of 92%, while the operating steps in the deviating order C, B, A, D, . . . F will be executed with a probability of 3%, etc. At the same time, it is possible when generating a test scenario to specify that those operating steps are to be used for generating the test scenario that will be initiated by the user with the greatest probability. In the above example, only the workflow A, B, C to F will be tested.

In an alternative embodiment, the selection is carried out on the basis of rules which can be generated via a knowledge-based system. Alternatively, the selection can also be made by means of a user interface, via which the user selects the respective operating step from the set listed in the form of a menu. In this way, the test scenario can be adaptively modified by the test engineer to the respective application case.

The object is additionally achieved in a device for testing installations, in particular medical engineering installations, which can be operated by different persons in different ways, comprising:

at least one recording unit which is intended for recording a plurality of operating scenarios and/or their operating steps, at least one analysis unit which is intended for analyzing each operating scenario into a sequence of operating steps, at least one assignment unit which is intended for categorizing the individual operating steps into classes, at least one rule base in which rules are filed which comprise dependencies between the individual operating steps and/or between their classes, at least one generation unit which is intended for generating at least one test scenario dynamically, based on the operating steps generated by the analysis unit and/or on the class generated by the assignment unit and/or on the rules of the rule base.

In the preferred embodiment, the testing device according to the invention comprises a player module which is intended for executing automatically the generated test scenarios and serves, so to speak, as an execution unit.

That which was stated above with regard to the method according to the invention also applies analogously to the device according to the invention.

The inventive embodiments of the method described above can also be fashioned as a computer program product with corresponding program code means which can be loaded into a memory of a programmable computer device e.g. connected to or integrated within the medical engineering installation to be tested, which computer device is prompted to implement the inventive method described above when the program code is executed by a processor of the computer device. The computer program product can in particular also be fashioned in the form of a storage medium on which the program code means for implementing the computer-implemented method described above are filed in a manner readable by a computer device.

In addition, it is possible for individual components of the method described above to be executed in one saleable unit and the remaining components in another saleable unit—as a distributed system, so to speak.

The components of the method described above can already have been integrated in a saleable unit but can also be integrated subsequently as a stand-alone product.

Further advantageous embodiments will emerge from the subclaims.

BRIEF DESCRIPTION OF THE DRAWINGS

In the detailed description of the figures below, exemplary embodiments, not to be interpreted in a restrictive manner, are discussed, together with their features and further advantages, with reference to the drawings, in which.

DETAILED DESCRIPTION OF THE INVENTION

The exemplary embodiment described below relates to medical engineering installations A, such as nuclear spin tomographs, computer tomographs, X-ray devices or other medical products which are deployed in the clinical environment, as well as to any types of medical engineering devices, computer-aided devices or hand-held devices. However, it also falls within the scope of the invention to apply the basic principle to installations and/or devices in other technical fields such as e.g. production engineering, etc. Overall, the invention can be used for all computer-controlled systems which permit a high technical complexity and consequently a high degree of variance of operation.

As a rule, installation A is a relatively complex installation. A test method which is intended to check such an installation A for freedom from faults should desirably be executed under conditions that are as real as possible. According to the invention, the clinically relevant usage behavior is therefore used in respect of the usage of the installation A in generating test scenarios.

In this context, it must also be taken into account that an installation A is operated as a rule by different persons in different ways. All the different types of operation should be taken into account when a test is carried out. This is achieved according to the invention by recording a plurality of different operating scenarios. One operating scenario is a workflow for a real clinical use or operation of the installation A. As a rule, there are multiple operating options for the medical engineering product A and thus a plurality of such workflows. A workflow is characterized by a sequence of operating steps on the product. At a point in time within the workflow, there can be multiple options for the selection of a next operating step. Selecting an operating step from the set of basically possible operating steps at the point in time within the operating workflow can be effected according to the invention in accordance with different mechanisms.

As a rule, predefined rules are accessed here which define dependencies between the individual operating steps. It is, however, also possible to integrate external applications, tools or inputs via a user interface.

Figure 1:
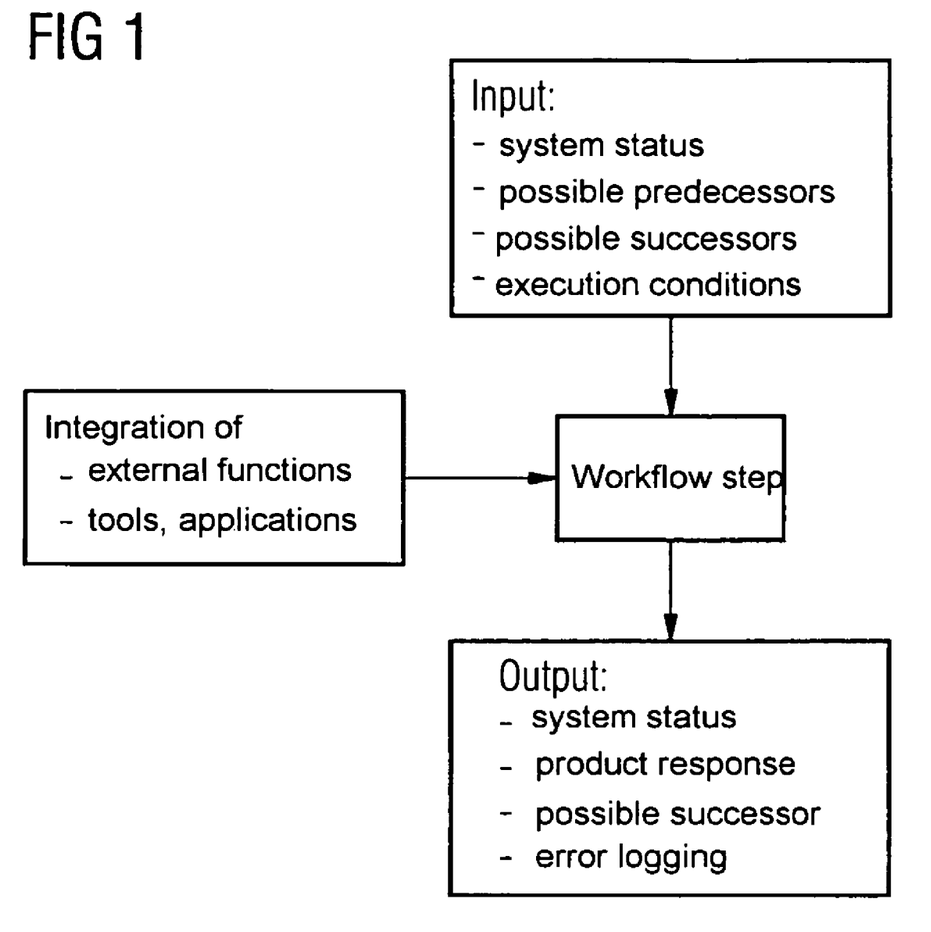
FIG. 1 shows an overview-type representation of input/output dependencies of an operating step according to a preferred embodiment of the invention.

FIG. 1 shows in the manner of an overview the input/output dependencies of a workflow step or operating step. The input variables comprise the system status of the installation A, possible predecessors (of operating steps), possible successors and execution conditions. In the execution of the subsequent operating step, boundary conditions must be observed such as e.g. the necessary adherence to a sequence of instructions so that a step can be executed at this point or not. These boundary conditions can be filed in rules.

The operation of installation A by authorized persons such as e.g. medical engineering assistants or doctors, is triggered and evaluated by automation tools, external special applications or telegrams in the system. A workflow step consists as a rule of an instruction for the installation A and can comprise e.g. the pressing of a knob on the interface or the switching on of the system.

The output after the execution of each operating step comprises the system status (which will differ as a rule from the initial system status before execution of the respective operating step), the product response, that is the behavior of the installation A after execution of the operating step, possible successors and a logging of errors. After execution of an operating step, the installation A basically finds itself in a new status which has to be evaluated and logged. It has to be decided what follow-up action is appropriate.

Depending on the type or complexity of the installation to be tested, there are basically two options:

If an installation A is one with relatively few workflow steps, then it is appropriate to carry out the testing at intervals, so to speak, the test being carried out from each individual Workflow step to workflow step, the possible follow-up actions being selected after the execution of a step.

In a complex installation A that comprises a plurality of workflow steps, it can be appropriate to specify in advance before implementation of the test a workflow which comprises a plurality of individual workflow steps in order to execute the test as a complete package (that is, until final execution of the last workflow step within the workflow).

In both of the test scenarios specified above, the selection of one workflow step from the set of basically possible workflow steps is made according to different mechanisms, e.g. a probability-based mechanism or a random mechanism based on the principle of chance.

Figure 2:
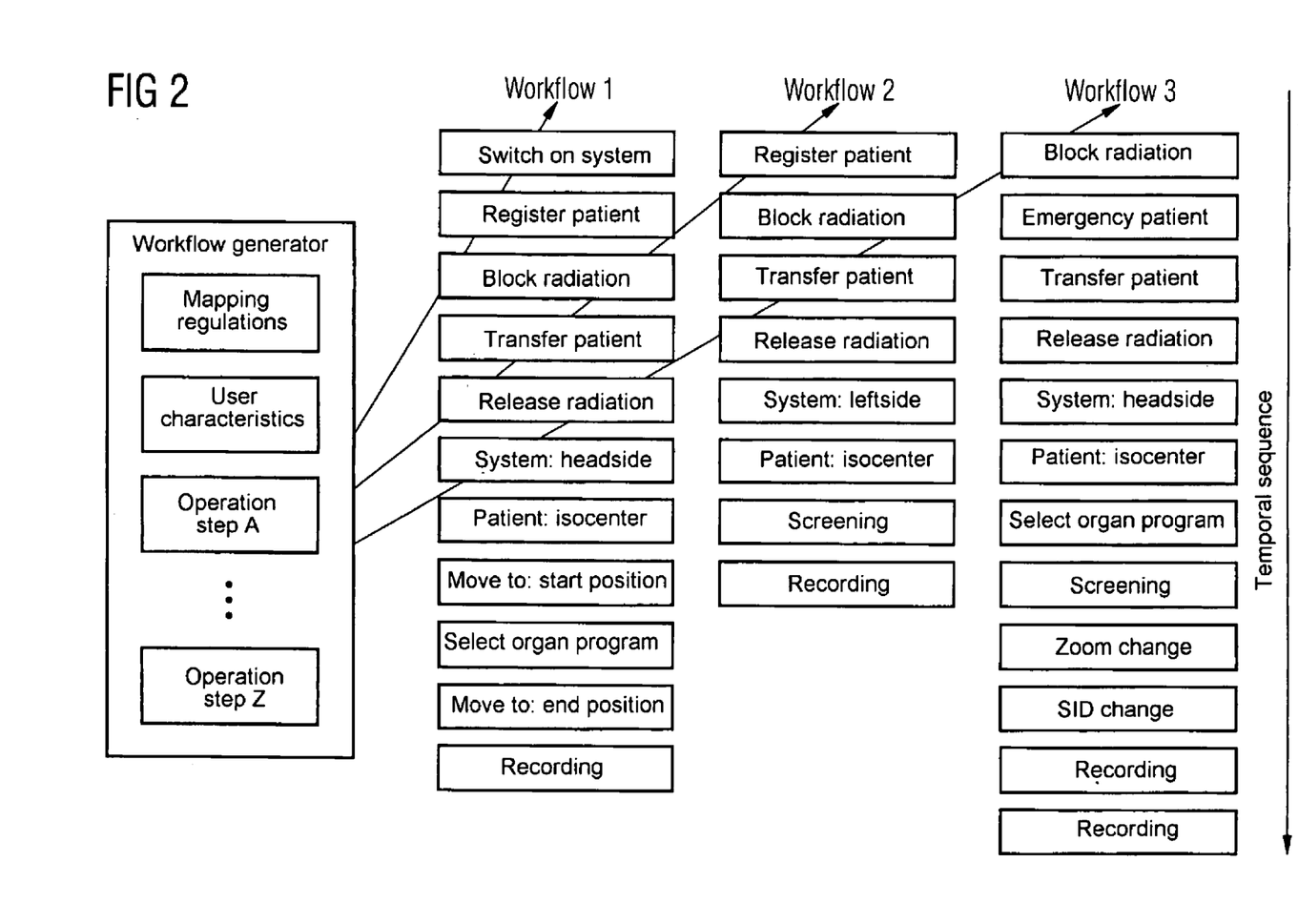
FIG. 2 shows an overview-type representation of a test scenario generated according to the invention, comprising workflows 1 to 3.

FIG. 2 shows an overview-type representation of the workflow generator according to the invention, comprising in this example three workflows. As shown in FIG. 2, the three workflows comprise differing numbers of operating steps and consist in part of different operating steps which are meant to be executed consecutively over time.

Figure 3:
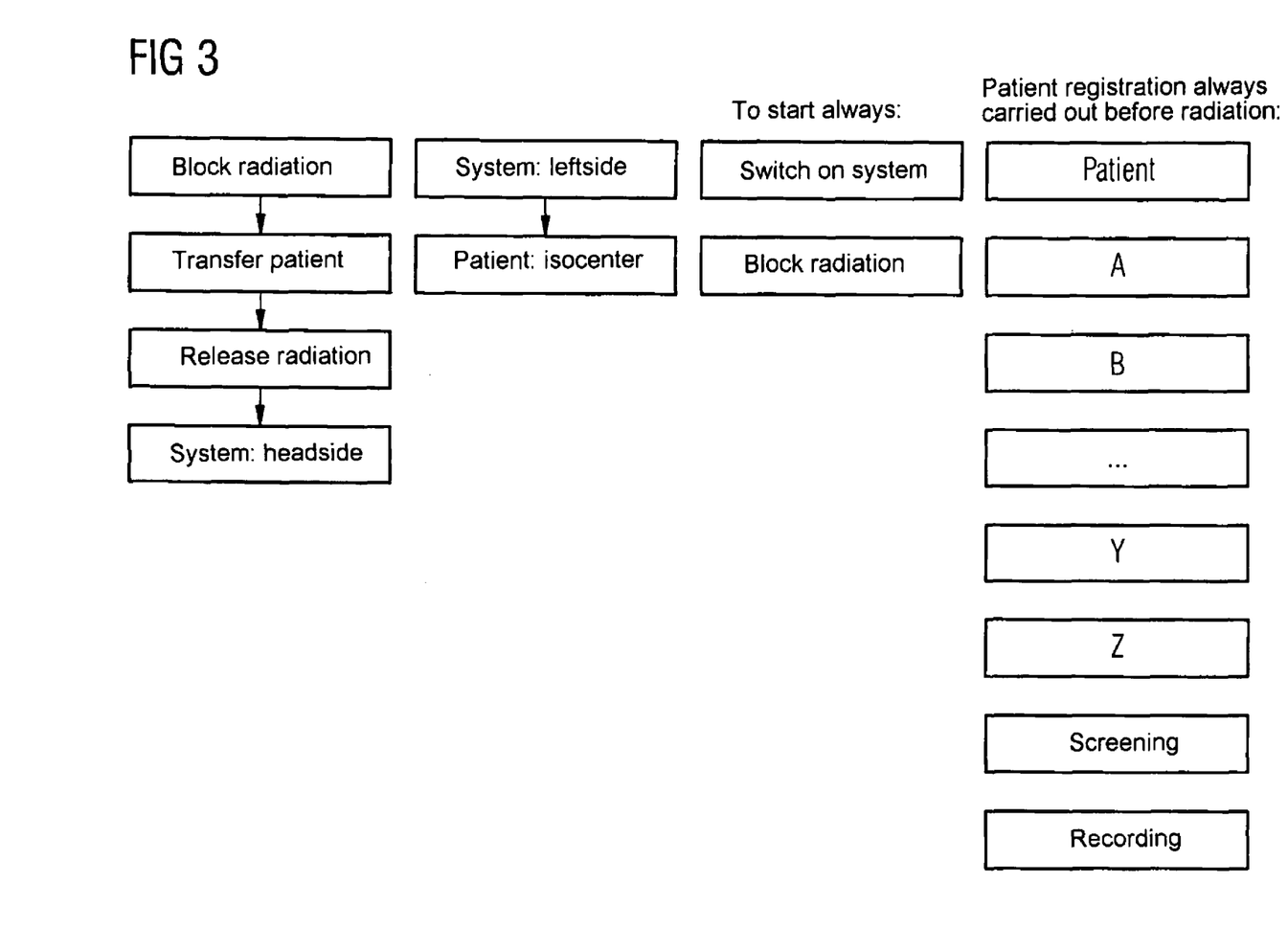
FIG. 3 shows an overview-type representation of an example of an automated and dynamically generated test scenario based on rules.

Since there are different users on the device or on the installation A, their operations differ. This results in there also being different workflows depending on the characteristic of the user. As shown in FIG. 3, the selection of operating steps within a workflow is not, however, made randomly but normally in accordance with predeterminable rules. The arrows pointing downward in FIG. 3 symbolize such rules. For example, initially the system must always be switched on before radiation can be blocked. Likewise, before "radiation", a 'patient registration' must always be carried out. Accessing rules can restrict test coverage to clinically relevant conditions of use. In an alternative embodiment, it is possible not to access these rules, but to select the individual operating steps according to a different mechanism, in particular by accessing a random-sequence generator. A sequence of steps that is not permitted or is not possible can be characterized here by a probability "0". If through random selection the necessary sequence of steps is not now adhered to, then it is possible to test the installation A for a worst-case operation. It can now be investigated whether the installation A is also correctly terminated when there is an operator error (e.g. in the event of failure to adhere to a temporal sequence of operating steps) with an appropriate error message.

Figure 4:
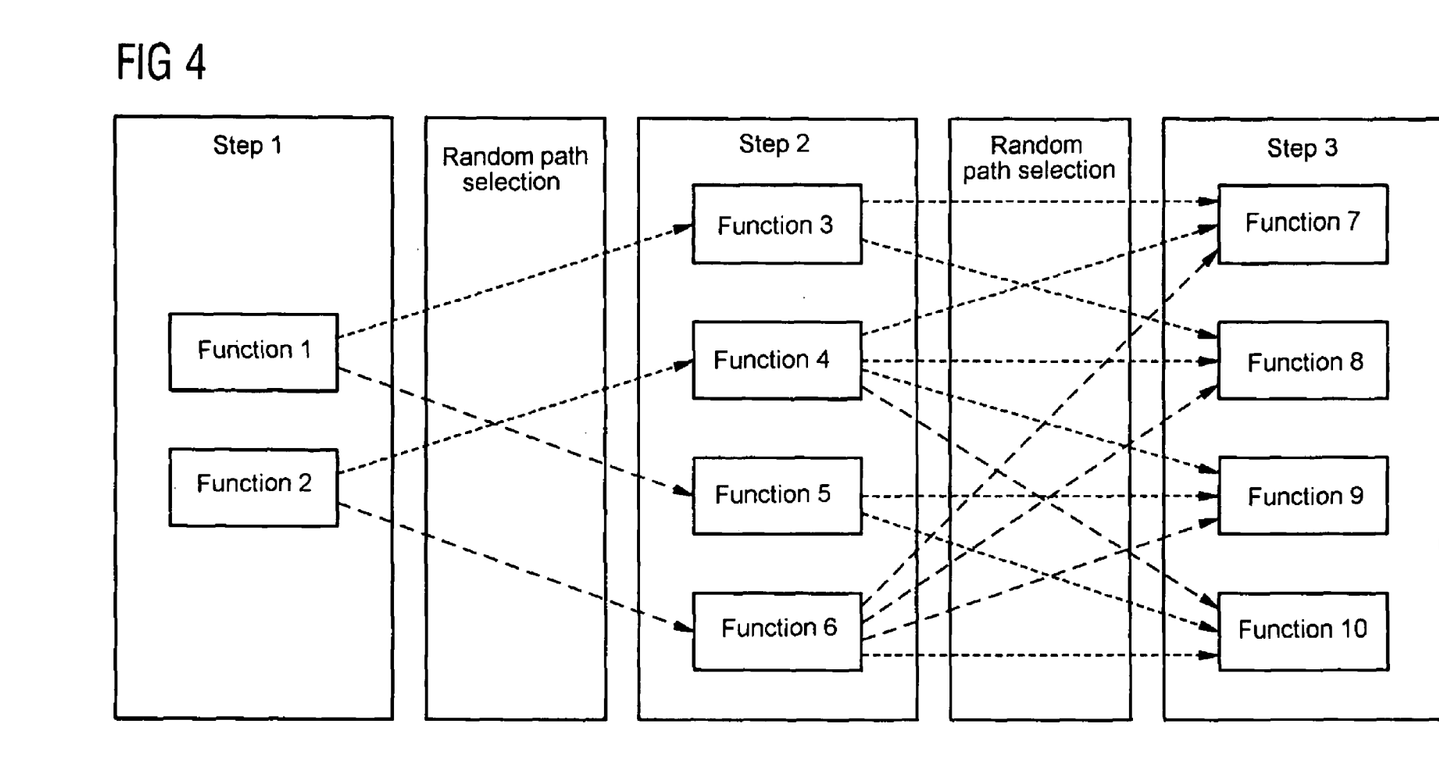
FIG. 4 shows an overview-type representation for a random-variable-type selection of an operating step when generating the test scenario.

FIG. 4 shows by way of example how the coverage of the test can be increased by automatically generating a test scenario of a type in which the individual operating steps are selected by means of a random-variable mechanism. 'Step 1', Step 2' and Step 3' are meant to represent successive operating steps of a workflow over time in the use of the medical product A to be tested. The respective functions are meant to symbolize possible user actions during the execution of an operating step. Depending on the selection of the function to be executed next in each case, a different path will emerge for the respective test scenario. The selection of possible operating steps or functions from the set of basically possible operating steps can be carried out e.g. using random numbers and/or in a probability-based manner. In the example shown in FIG. 4, three steps are shown: 'Step 1', 'Step 2' and 'Step 3'. The steps correspond to classes or groups of operating steps. In step 1 or in class 1 function 1 and function 2 can basically be executed, while in the second class functions 3 to 6 and in class 3 functions 7 to 10 can be executed. The functions correspond to the operating steps. After execution of a function x in a step y, multiple functions can as a rule be executed in step y+1. Which function is selected for this, is based in this example on a random path selection, in particular by accessing a random sequence generator. In FIG. 4, the dotted lines between the individual functions mark the respective best-case operations and the dashed lines between the individual functions are meant to symbolize possible fault provocations. The advantageous embodiment provides that the test engineer can influence this selection mechanism through a suitable user interface and can thus gear the test toward specific conditions of use and consequently can also change the coverage of the test.

Figure 5:
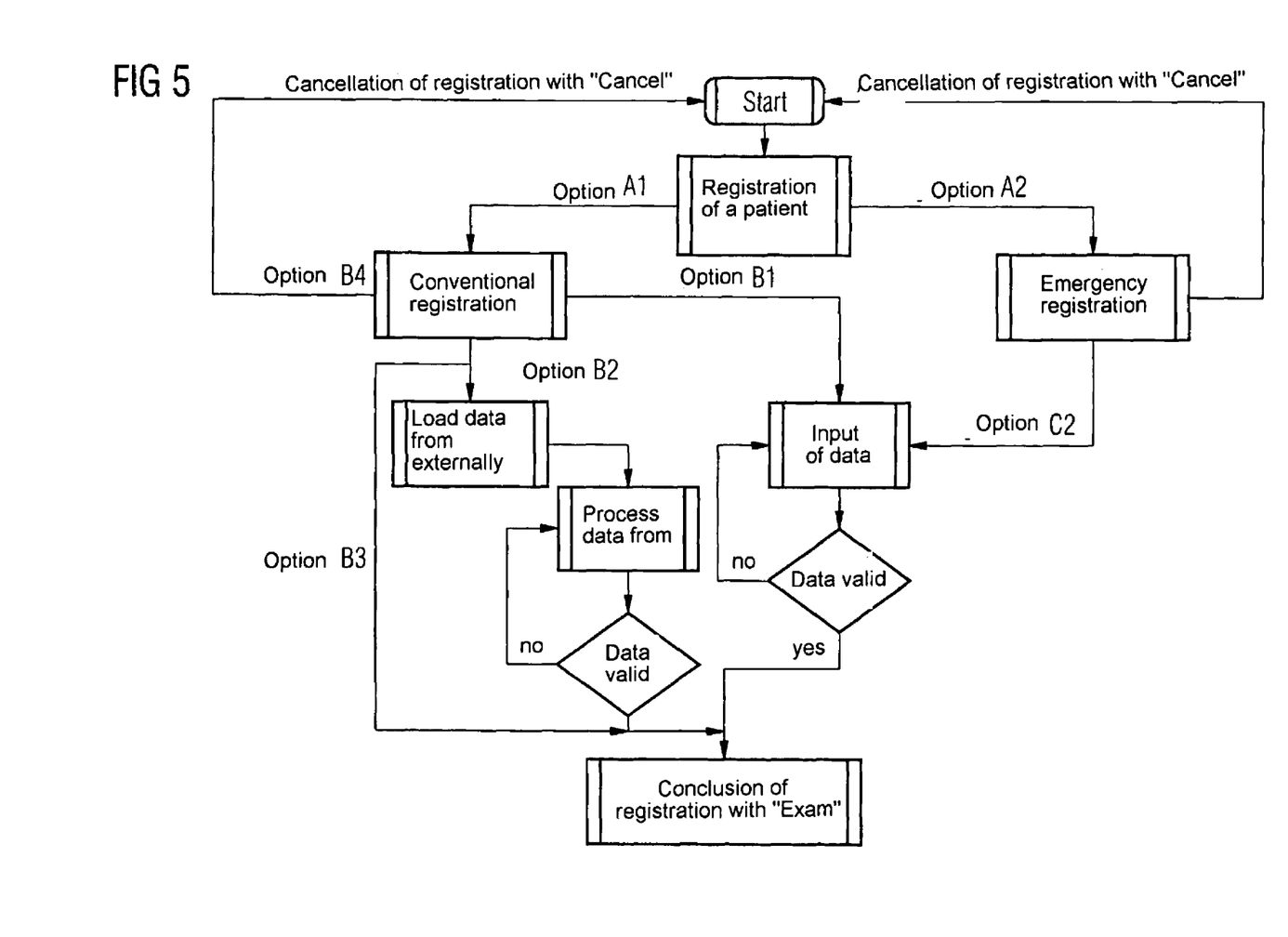
FIG. 5 shows a flow diagram, taking into account a random-variable-type selection of an operating step.

FIG. 5 shows, by way of example, the execution of a possible test scenario in the form of a flow diagram. After the start, there are generally multiple options (Ai or Bi or Ci) for selecting the next operating steps. The sequence shown in FIG. 5 represents only a section of a possible test scenario and as a rule is logged. This makes it possible to record and store the characteristics and configuration of the test scenario and its execution and optionally to use these at a later time for a more far-reaching analysis or to execute them adjustably often.

Figure 6:
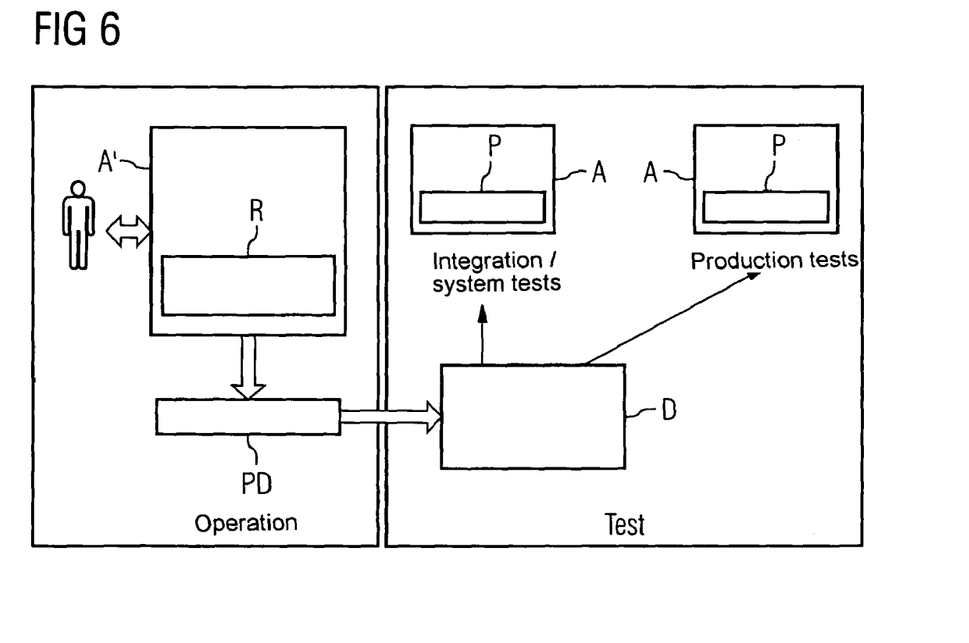
FIG. 6 shows an overview-type representation for the deployment of the device according to the invention.

FIG. 6 shows the interaction between the recording of operating scenarios through the real use of the installation A and the testing of the installation A through execution of at least one test scenario. The left-hand field in FIG. 6 shows the real operation of the installation A', while the testing of the installation A is marked in the right-hand field. A recorder device R or a "recorder module" R records the real use or operation of the installation A'. The recorder module is in the preferred embodiment a standardized software or hardware module which can be implemented in other complex systems and can thus be available to a plurality of medical engineering products. The recorder module R records the use of the medical engineering installation A' (e.g. calling of individual functions, operation of the installation, etc.) and files the data recorded in this manner which relates to the operating scenario in a log file PD. The log file PD is fed to an analytical database D. In a further module which accesses the database D, the test scenario is automatically and dynamically generated according to the invention and fed to a "player" P or a player module P. The player P is connected or assigned to the installation A and receives the automatically generated test scenario from the database D. The player module P implements the test scenarios automatically and controls or operates the medical product A in accordance with clinical use in the field.

Depending on the configuration of the test scenario and depending on interpretation of the rules, the installation A is operated in a different way. Normally it is preconfigured that the test scenarios are generated such that they correspond to the most frequent usage in current deployment. This is preferably carried out by assigning probabilities to the different execution paths within the test scenario. This has the advantage that the method according to the invention is independent of the persons using the installation A' and also independent of the respective application field. Further advantages lie in the automated forwarding or transmission of the test scenarios to the player module and in the automated operation of the test scenarios by the player module. In this way, faults which arise as a result of incorrect operation of the test method can be avoided. As shown schematically in FIG. 6, according to the invention a real operating scenario is converted into an automatically and dynamically generated test scenario which is executed by the player module P. The recorder module R is intended for recording the plurality of operating scenarios and for filing them in a log file PD. The further steps of the method, namely the analysis of the recorded operating scenario into individual operating steps, the categorizing of the individual operating steps into classes and the accessing of rules and the dynamic generating of a test scenario are normally carried out by accessing the analysis database D and by means of the player module P. Furthermore, the player module P is intended for executing the generated test scenario. By means of the recorder module R, it is possible to record automatically and methodically the clinically relevant usage of the installation A', which is then transformed into a test scenario.

Figure 7:
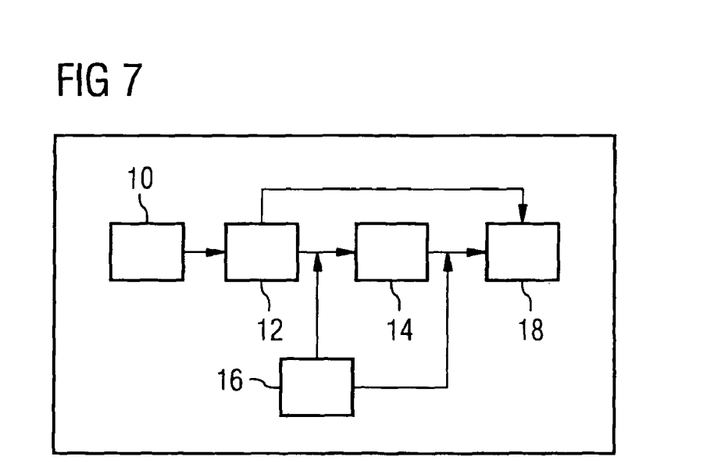
FIG. 7 shows an overview-type representation of the units of an inventive device according to a preferred embodiment of the invention.

FIG. 7 shows key units of the device according to the invention and their functional interaction. A recording unit 10 roughly corresponds to the recorder module and is intended for recording the operating scenarios. The operating scenarios are fed to an analysis unit 12 which in each case analyzes the recorded operating scenario into a sequence of operating steps or workflow steps. In an assignment unit 14, the individual operating steps are grouped into classes. Normally, a rule base 16 is accessed in which rules are filed which comprise dependencies between the individual operating steps and/or between their classes. A test scenario is generated automatically and dynamically from the individual operating steps of the analysis unit 12 and normally by accessing the rules of the rule base 16. This is done in the generating unit 18. Alternatively, it is also possible for a test scenario to be generated by accessing the rule base 16 and by accessing the assignment unit 14.

One of the key advantages of the solution according to the invention is that flexibility can be increased, as the method can be adaptively modified to different application scenarios, and a plurality of different test scenarios can be drawn up by accessing rules when generating test scenarios, which rules specifically adapt the workflow generated in each case to the particular usage of the installation A. At the same time, it is possible automatically to take account of a plurality of influencing factors for the test, namely a sequence of operating steps which has to be adhered to, the selection of possible predecessors and successors of operating steps, operating steps which have compulsorily to be processed consecutively, certain environmental conditions which are necessary for the execution of operating steps, predefined system responses, etc. In the preferred embodiment, the recorder R and the player P are each integrated as a separate module in the installation A', A concerned. Alternatively, it is possible to connect the recorder R and the player P, as a separate module in each case, via a data connection to the installation A', A concerned and to provide them as an external unit. This has the advantage that the separate modules P, R can also be used for the testing of other installations A. In the preferred embodiment, the log file is transmitted via suitable media to the analysis database D, in particular to the medical-usage database, in particular by means of "Rdiag/Rwatch" methods. As shown in FIG. 6, the test scenarios generated in each case are exported to the player P in order to enable the test to run automatically. It is immaterial here whether the player P is used within an integration and system test or within a production test. One advantage of using the analysis database D is that the usage habits determined for the test, in particular also the statistical evaluation of usage conditions, can also be used for later tests or for further analysis procedures.

In conclusion, it should be pointed out that the description of the invention and the exemplary embodiments must on principle not be interpreted restrictively in terms of a specific physical implementation of the invention. It is particularly obvious to a relevant expert that the invention can be implemented as a heterogeneous system partially or completely in software and/or hardware and/or on multiple physical products—including, in particular, computer program products—in a distributed manner.

The invention claimed is:

1. A method for testing a complex computer-aided installation which is operated by a plurality of users in a plurality of applications, comprising:
   recording a plurality of operating scenarios by a recording device, wherein the operating scenarios comprise normal operating instructions of the installation issued by the users;
   analyzing the recorded operating scenarios into a sequence of operating steps by an analyzing device;
   categorizing the operating steps in a plurality of classes by an assignment device;
   accessing a plurality of rules which comprise a plurality of dependencies between the operating steps by a rule base device; and
   dynamically generating an executable test scenario based on the operating steps in the recorded operating scenarios for operating the installation by a generating device,
   wherein the rules are changed in a temporally advanced process for modifying a coverage of the test scenario.

2. The method as claimed in claim 1, wherein the dependencies are:
   defined between the classes,
   technical preconditions for executing the operating steps, and
   temporal dependencies.

3. The method as claimed in claim 1, wherein the installation is a medical engineering installation in an active clinical service.

4. The method as claimed in claim 3, wherein the medical installation has a plurality of real operating scenarios that are recorded and the test scenario is generated using the real operating scenarios.

5. The method as claimed in claim 1, wherein the test scenario is automatically executed after the test scenario is generated.

6. The method as claimed in claim 1, wherein the test scenario is configured by recording a parameter in a process step.

7. The method as claimed in claim 6, wherein the method comprises a step for displaying the classes or the rules or the test scenario with the configured parameter.

8. The method as claimed in claim 1, wherein the step of accessing the rules is carried out by deriving the rules from the operating scenarios or from the operating steps or from the classes.

9. The method as claimed in claim 8, wherein the step of accessing the rules is carried out by accessing an installation with a known knowledge system.

10. The method as claimed in claim 1, wherein the step of accessing the rules is carried out by importing the rules from an external source or via a user interface.

11. The method as claimed in claim 1, wherein the operating scenario is application specific and the test scenario is device specific.

12. The method as claimed in claim 1, wherein the test scenario comprises a best-case operation or a worst-case operation.

13. The method as claimed in claim 12, wherein the test scenario is generated by selecting an operating step from the plurality of operating steps based on an executable chance or probability of the operating steps.

14. The method as claimed in claim 13, wherein the test scenario is generated based on the operating classes or the rules.

15. The method as claimed in claim 1, wherein an error message is generated if the rules are not observed when testing the installation.

16. A device for testing a complex computer-aided installation which is operated by a plurality of operators in a plurality of operations, comprising:
   a recording device for recording a plurality of operating scenarios, wherein the operating scenarios comprise normal operating instructions of the installation issued by the users;
   an analyzing device for analyzing the recorded operating scenarios into a sequence of operating steps;
   an assignment device for assigning the operating steps in a plurality of classes;
   a rule base device for filing a plurality of rules which comprise a plurality of dependencies between the operating steps; and
   a generating device for dynamically generating a test scenario based on the operating steps in the recorded operating scenarios for operating the installation,
   wherein the rules are changed in a temporally advanced process for modifying a coverage of the test scenario.

17. The device as claimed in claim 16, wherein the installation is a medical engineering installation.

18. The device as claimed in claim 17, wherein a recorder for recording a plurality of real operating scenarios is arranged in the medical engineering installation in an active clinical service and the test scenario is generated based on the real operating scenarios.

19. A computer program loaded into a computer for testing a complex computer-aided installation which is operated by a plurality of operators in a plurality of operations, comprising using the computer to execute the steps of:

analyzing a plurality of recorded operating scenarios into a sequence of operating steps, wherein the operating scenarios comprise normal operating instructions of the installation issued by the users;

assigning the operating steps in a plurality of classes;

accessing a plurality of rules which comprise a plurality of dependencies between the operating steps; and     dynamically generating an executable test scenario based on the operating steps in the recorded operating scenarios for operating the installation, wherein the rules are changed in a temporally advanced process for modifying a coverage of the test scenario.

* * * * *